UNITED STATES PATENT OFFICE.

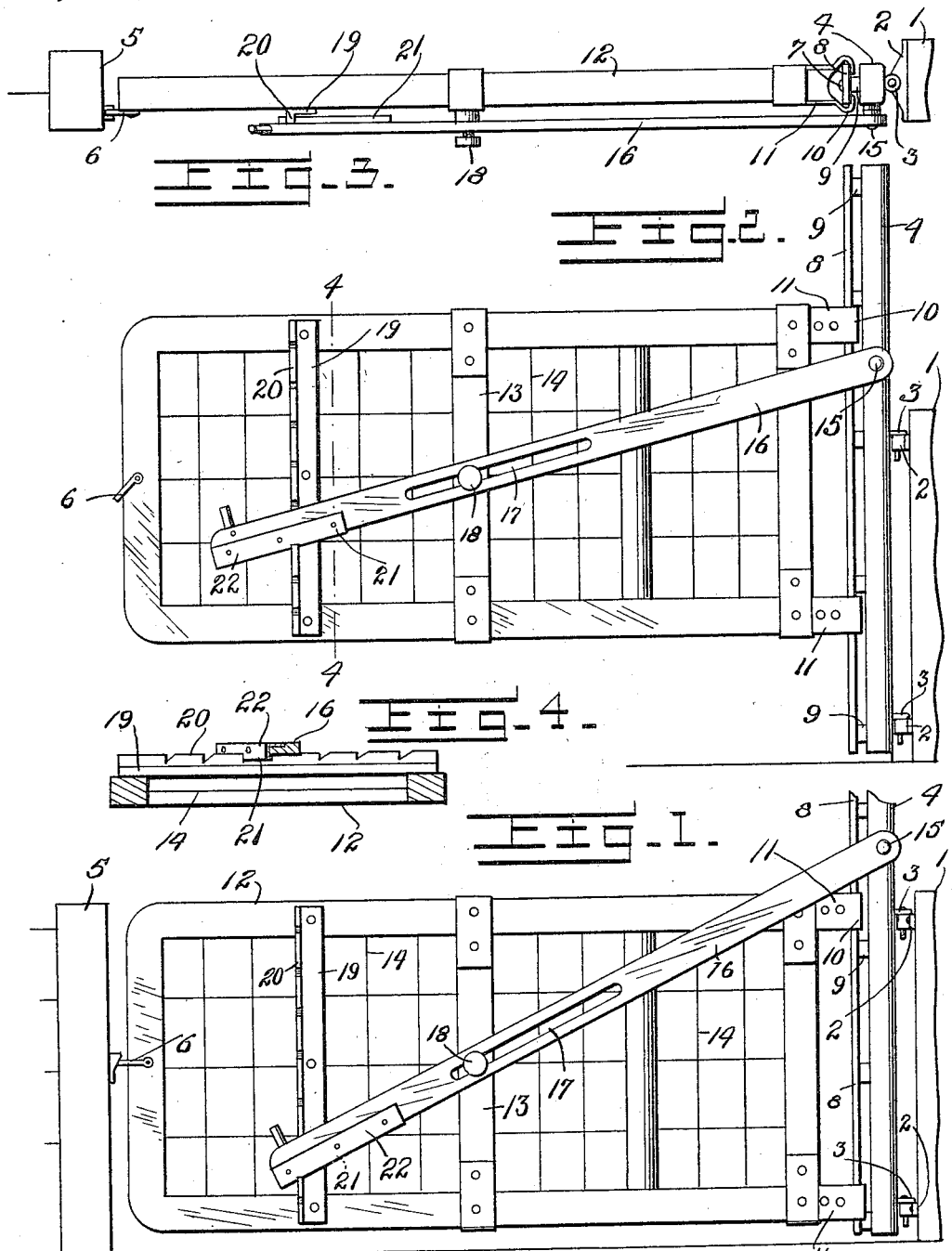

ABNER P. EVEREST, OF NEW HARTFORD, IOWA.

GATE.

1,045,537.

Specification of Letters Patent.

Patented Nov. 26, 1912.

Application filed August 23, 1911. Serial No. 645,478.

*To all whom it may concern:*

Be it known that I, ABNER P. EVEREST, a citizen of the United States, residing at New Hartford, in the county of Butler and State of Iowa, have invented certain new and useful Improvements in Gates, of which the following is a specification.

My invention relates to improvements in gates, and has for its leading object the provision of an improved farm gate which may be either swung in a horizontal plane to allow wagons or large animals to pass therethrough or which may be partially raised and locked in desired vertically adjusted position to allow swine or other small animals to pass therebeneath while keeping the larger stock within the inclosure controlled by the gate.

The further object of my invention is the provision of an improved form of guide for permitting the ready vertical sliding of the gate and of improved means for locking the gate in desired adjusted position.

Other objects and advantages of my improved gate will be readily apparent by reference to the following description taken in connection with the accompanying drawings and it will be understood that I may make any modifications in the specific structure shown and described within the scope of my claim without departing from or exceeding the spirit of my invention.

Figure 1 represents a view of my gate in its normal closed position. Fig. 2 represents a view thereof with the gate partially raised. Fig. 3 represents a top plan view of the gate and supporting posts therefor, and Fig. 4 represents a fragmentary sectional view on the line 4—4 of Fig. 2.

In the drawings, the numeral 1 designates the main or hinge post of the fence having projecting inward therefrom the angular pivot brackets 2 for engagement in the eyes 3 carried by the guide post 4 for the gate, a second fence post 5 being disposed to be engaged by the latch 6 carried by the gate. Secured to the inner face of the guide post 4 by the fastenings 7 is a guide plate 8 held spaced from the post 4 by the interposed washers 9 mounted upon the fastenings 7. Embracing the edges of the plate 8 are the angular ends 10 of the bracket members 11 secured to the ends of the gate frame 12 having the vertical braces 13 and the brace and guard wires 14 secured thereto. It will thus be seen that the gate may either be swung on the brackets 2 and eyes 3 as a pivotal mounting or it may be bodily lifted, the portions 10 of the brackets 11 riding on the guide plate 8 when the gate is vertically shifted.

To enable me to lock my gate in desired adjusted position, I pivot to the post 4 on the screw 15 disposed on one side of the post intermediate its height the locking lever 16. Said lever extends diagonally of the gate proper when the same is in its normal lowered position or in its most raised position, and formed intermediate the length of the lever is a slot 17 in which is slidably engaged the screw 18 secured to one of the vertical braces 13 of the gate. As the gate is vertically moved the lever is caused by the screw 18 to swing first to lie straight across the gate and then to incline diagonally thereacross as the gate is raised higher.

To secure the gate in desired raised position, I fasten thereto the plate 19 having the outwardly projecting ratchet portion 20 adapted to be engaged by the inwardly extending flange 21 of the plate 22, secured on the lever 16, engagement of said flange with any of the ratchet teeth of the plate 19 holding the lever against pivotal movement and thus securing the gate in position as will be readily understood by reference to the drawings.

From the foregoing description taken in connection with the accompanying drawings the construction of my improved gate will be readily understood and it will be seen that I have provided an improved form of adjustable gate which may be easily raised or lowered and in which the lever by being slidably and pivotally connected to the gate and pivotally secured to the guide post for the gate when secured at its outer end in desired adjusted position will satisfactorily and securely retain the gate at the correct height.

I claim:

In combination with a main supporting post, of a second post hingedly connected thereto, a guide plate mounted upon the second post, said plate extending the entire height of said post and being spaced therefrom, a gate having brackets upon its upper and lower inner corners, said brackets embracing the guide plate and being slidably mounted thereon, a lever having its inner end pivotally connected to the second post and connected intermediate its ends to the gate, a ratchet plate secured to the gate, a plate carried by the outer end of the lever for interlocking engagement with the ratchet plate, whereby upon operation of the lever the gate may be adjusted vertically and held in adjusted position upon engagement of the plate upon the outer end of the lever and ratchet plate secured to the gate.

In testimony whereof I affix my signature, in the presence of two witnesses.

ABNER P. EVEREST.

Witnesses:
B. D. WRIGHT,
A. A. SIMBOIC.

Copies of this patent may be obtained for five cents each, by addressing the "Commissioner of Patents, Washington, D. C."